United States Patent
Zhu

(10) Patent No.: US 9,084,157 B2
(45) Date of Patent: Jul. 14, 2015

(54) APPARATUS, METHOD AND COMPUTER PROGRAM PRODUCT PROVIDING NON-SYNCHRONIZED RANDOM ACCESS HANDOVER

(75) Inventor: Yuan Zhu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 1150 days.

(21) Appl. No.: 12/443,331

(22) PCT Filed: Sep. 21, 2007

(86) PCT No.: PCT/IB2007/002761
§ 371 (c)(1),
(2), (4) Date: May 12, 2010

(87) PCT Pub. No.: WO2008/038093
PCT Pub. Date: Apr. 3, 2008

(65) Prior Publication Data
US 2010/0260140 A1    Oct. 14, 2010

Related U.S. Application Data

(60) Provisional application No. 60/847,764, filed on Sep. 27, 2006.

(51) Int. Cl.
*H04W 36/00* (2009.01)
*H04W 74/08* (2009.01)
*H04W 74/00* (2009.01)

(52) U.S. Cl.
CPC ...... *H04W 36/0005* (2013.01); *H04W 36/0077* (2013.01); *H04W 74/0833* (2013.01); *H04W 74/008* (2013.01)

(58) Field of Classification Search
USPC ......................................... 370/331, 343, 344
See application file for complete search history.

(56) References Cited

U.S. PATENT DOCUMENTS

| | | | |
|---|---|---|---|
| 6,633,554 B1 * | 10/2003 | Dalal | 370/331 |
| 7,299,048 B2 * | 11/2007 | Lim et al. | 455/442 |
| 2001/0044311 A1 * | 11/2001 | Larsson et al. | 455/456 |
| 2005/0265293 A1 | 12/2005 | Ro et al. | |
| 2007/0047493 A1 * | 3/2007 | Park et al. | 370/331 |
| 2007/0110009 A1 * | 5/2007 | Bachmann et al. | 370/338 |
| 2008/0268849 A1 * | 10/2008 | Narasimha et al. | 455/437 |
| 2010/0173634 A1 * | 7/2010 | Kato et al. | 455/438 |
| 2010/0178920 A1 * | 7/2010 | Kitazoe et al. | 455/436 |

FOREIGN PATENT DOCUMENTS

WO    2007/083230 A2    7/2007

OTHER PUBLICATIONS

Nokia "3GPP TSG RAN WG1 LTE Ad Hoc" R1-061901, Jun. 27, 2006.*

(Continued)

*Primary Examiner* — Robert M Morlan
(74) *Attorney, Agent, or Firm* — Harrington & Smith

(57) ABSTRACT

A method is provided including sending a source Node-B a target Node-B cell-specific unique identifier for a user equipment to be handed over to the target Node-B, sending the source Node-B a predetermined access preamble sequence for the user equipment to be handed over to the target Node-B, and in response to receiving the predetermined access preamble sequence from the user equipment, sending the user equipment handover related information in association with the cell-specific unique identifier for handing over to the target Node-B.

17 Claims, 6 Drawing Sheets

(56) References Cited

OTHER PUBLICATIONS

IPWireless "Preamble-based shared channel ID assignment during initial access" R1-061893 Jun. 27-30, 2006.*

International Search Report and Written Opinion received for corresponding Patent Cooperation Treaty Application No. PCT/IB2007/002761, dated May 5, 2008, 11 pages.

ZTE, RITT; "random access procedures"; 3GPP TSG-RAN Working Group 2 Adhoc on LTE, R2-061881; Jun. 27, 2006; whole document (4 pp.); Cannes, France.

Nokia; "Non-contention based handover execution"; 3GPP TSG-RAN WG2 Meeting #54, R2-062210; Aug. 28, 2006; whole document (3 pp.); Tallinn, Estonia.

Samsung; "Information of the random access preambles"; 3GPP TSG RAN2#54, R2-062261; Aug. 28, 2006; whole document (2 pp.); Tallinn, Estonia.

Huawei Technologies Co., Ltd.; "LTE Protocols and Procedures"; Mar. 1, 2006; pp. 8-128 through pp. 8-132, paras. 8.1-8.1.3, and figures 8-2.

"Non-synchronized random access procedure", Nokia, 3GPP TSG RAN WG1 LTE Ad Hoc, R1-061901, Jun. 2006, 4 pgs.

\* cited by examiner

US 9,084,157 B2

APPARATUS, METHOD AND COMPUTER PROGRAM PRODUCT PROVIDING NON-SYNCHRONIZED RANDOM ACCESS HANDOVER

RELATED APPLICATION

This application was originally filed as PCT Application No. PCT/IB2007/002761 filed Sep. 21, 2007, which claims the priority of U.S. Provisional Application No. 60/847,764 filed Sep. 27, 2006.

TECHNICAL FIELD

The exemplary and non-limiting embodiments of this invention relate generally to wireless communication systems, methods, devices and computer program products and, more specifically, relate to techniques for handing off a mobile device from one fixed wireless network node to another.

BACKGROUND

Certain abbreviations that may be found in the description and/or in the Figures are herewith defined as follows:
3GPP third generation partnership project
UTRAN universal terrestrial radio access network
EUTRAN evolved UTRAN
OFDM orthogonal frequency division multiplex
Node-B base station
eNB EUTRAN Node B
C-RNTI cell-specific radio network temporary identifier
T-C-RNTI temporary cell-specific radio network temporary identifier
S-Node-B source node B
T-Node-B target node B
TDD time division duplex
FDD frequency division duplex
TA timing advance
UE user equipment
SC-FDMA single carrier, frequency division multiple access
LTE long term evolution
UL uplink (UE to Node-B)
DL downlink (Node-B to UE)
HO handover
LCR low chip rate
LCR-TDD LCR-time division duplex
RU resource unit
RACH random access channel
MAC medium access control
SCH shared channel A proposed communication system known as evolved UTRAN (E-UTRAN, also referred to as UTRAN-LTE or as E-UTRA) is under discussion within the 3 GPP. A working assumption is that the DL access technique will be OFDM, and the UL access technique will be SC-FDMA.

A random access procedure has been discussed for the E-UTRA system. For example, according to R1-061651, 3GPP TR25.814, V1.5.0, the random access procedure includes synchronized random access and non-synchronized random access. The non-synchronized random access procedure would be mainly used when the UL has not been synchronized, or after synchronization between the UE and the Node-B has been lost. This applies to both initial access and HO.

As is stated in Section 9.1.2.1.1.3 of 3GPP TR25.814, "Non-synchronized random access procedure", prior to attempting a non-synchronized random access, the UE shall synchronize to the downlink transmission.

Two approaches for the random access procedure are considered.

Approach #1: FIG. 9.1.2.1.1.3-1 (shown herein as FIG. 1A) outlines this approach, where the Node B responds to the non-synchronized random access attempt with timing information to adjust the uplink transmission timing and an assignment of uplink resources to be used for transmission of data or control signaling (possibly including any message payload (e.g. UE ID) not included in the preamble) using the shared data channel. It may be noted that the timing information can also be combined with the uplink data resource allocation. Furthermore, the uplink data resource allocation may be implicitly indicated by associating a reserved time frequency region with a preamble sequence.

Approach #2: FIG. 9.1.2.1.1.3-2 (shown herein as FIG. 1B) outlines this approach, where the Node B responds to the non-synchronized random access attempt preamble with timing information and resource allocation for transmission of scheduling request (and possibly any additional control signaling or data). The UE then sends the scheduling request at the assigned time-frequency resource using the shared data channel or physical random access channel (for co-existing LCR-TDD based frame structure). The Node B adjusts the resource allocation according to the scheduling request from the UE.

Reference may also be had to R1-061901, Non-synchronized random access procedure, 27-30 Jun. 2006, Nokia, and to R1-061893, Preamble-based shared channel ID assignment during initial access, 27-30 Jun. 2006, IPWireless, for describing proposed non-synchronized random access procedures.

SUMMARY

In an exemplary aspect of the invention, there is a method comprising sending a source Node-B a target Node-B cell-specific unique identifier for a user equipment to be handed over to the Target Node-B, sending the source Node-B a predetermined access preamble sequence for the user equipment to be handed over to the target Node-B, and in response to receiving the predetermined access preamble sequence from the user equipment, sending the user equipment handover related information in association with the cell-specific unique identifier for handing over to the Target Node-B.

In another exemplary aspect of the invention, there is a computer readable medium encoded with a computer program executable by a processor to perform actions comprising sending a source Node-B a target Node-B cell-specific unique identifier for a user equipment to be handed over to the Target Node-B, sending the source Node-B a predetermined access preamble sequence for the user equipment to be handed over to the target Node-B, and in response to receiving the predetermined access preamble sequence from the user equipment, sending the user equipment handover related information in association with the cell-specific unique identifier for handing over to the Target Node-B.

In another exemplary aspect of the invention, there is an apparatus comprising a wireless transmitter, a wireless receiver, a handover control unit coupled to an interface and configurable to send to a source Node-B a target Node-B cell-specific unique identifier for a user equipment to be handed over to the target Node-B and to also send the source Node-B a predetermined access preamble sequence for the user equipment to be handed over to the target Node-B, and the handover control unit coupled to said wireless receiver and configurable to send to the user equipment via said wireless transmitter, in response to receiving the predetermined access preamble sequence from the user equipment, handover related information in association with the cell-specific unique identifier for handing over to the target Node-B.

In still another exemplary aspect of the invention, there is an apparatus comprising means for sending a source Node-B a target Node-B cell-specific unique identifier for a user equipment to be handed over to the target Node-B and for sending the source Node-B a predetermined access preamble sequence for the user equipment to be handed over to the target Node-B, and means for sending the user equipment handover related information in response to receiving the predetermined access preamble sequence from the user equipment, in association with the cell-specific unique identifier for handing over to the target Node-B.

In yet another exemplary aspect of the invention, there is a method of performing a handover comprising sending a message to a source Node-B to initiate a handover to a target Node-B, receiving from the source Node-B a target Node-B cell-specific radio network temporary identifier and a predetermined access preamble sequence, in conjunction with a HO start message, and sending the predetermined access preamble sequence to the target Node-B on a random access channel.

In still another exemplary aspect of the invention, there is an apparatus comprising a transceiver coupled to a processor configurable to send a message to a source Node-B to initiate a handover to a target Node-B, the transceiver configurable to receive from the source Node-B a target Node-B cell-specific radio network temporary identifier and a predetermined access preamble sequence, in conjunction with a HO start message, and the transceiver further configurable to send the predetermined access preamble sequence to the target Node-B on a random access channel.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

Figure 1A:
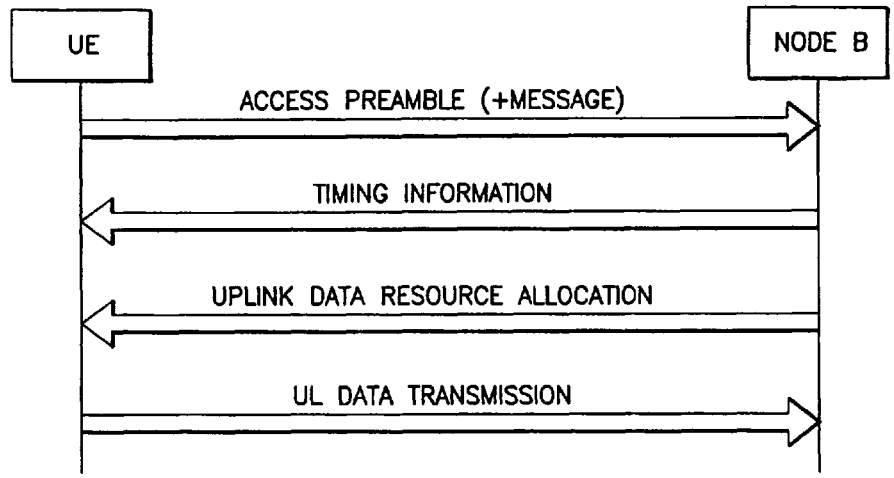
FIGS. 1A and 1B reproduce FIG. 9.1.2.1.1.3-1 and FIG. 9.1.2.1.1.3-2, respectively, from 3GPP TR25.814, V1.5.0.

By way of introduction, R1-061901, Non-synchronized random access procedure, Nokia, 27-30 Jun. 2006, discusses a non-synchronized random access procedure in accordance with 3GPP TR25.814. A bare preamble with no attached message part is transmitted first. The preamble signature carries no information on the requested resources. This information is included to the message send on the SCH, allocated after the Node-B observes the preamble. A two-step procedure is proposed, wherein the network assigns to the observed preamble a temporary identifier that is used for allocating UL resources for the transmissions following the preamble. In addition, the preamble collisions are resolved in an early phase of the random access procedure.

As is further stated, the non-synchronized random access procedure must be used if the UE TA may be invalid. If UE has C-RNTI, the purpose of the non-synchronized random access can be: (1) resource request, (2) handover, and (3) network initiated adjustment of TA. The causes (2) and (3) could also be handled using a scheduled resource with a large guard time. If the UE does not have C-RNTI, the possible causes are a move to LTE-ACTIVE state, and an update of the location area. In these cases, UEs are identified with TMSI, IMSI, or IMEI.

According to the proposal in R1-061901, when the Node-B observes a preamble, it assigns a temporary C-RNTI (T-C-RNTI) for the preamble's time, frequency and signature index and sends that in the acknowledgement of the preamble. T-C-RNTI is of the same length as C-RNTI, and only a small fraction of, the total number of C-RNTIs are needed for the temporary use. The UL-SCH resources are allocated with T-C-RNTI for the first transmission(s) after the preamble, which means that these allocations can be handled like any other allocations. That is beneficial considering the signaling of all the UL SCH allocations. With T-C-RNTI, Node-B can also order retransmissions of the first message(s).

The T-C-RNTI is said can be released after the UE has sent its already existing C-RNTI, or when a permanent C-RNTI is assigned for the UE in the cell association procedure (T-C-RNTI could also become the permanent C-RNTI in this phase), or when the random access procedure fails and a sufficiently long time has passed since T-C-RNTI was used for allocation.

Instead of an explicit assignment of T-C-RNTI, also considered is a system where the preamble's time, frequency and signature would map to a T-C-RNTI in a manner that the UE also knows. This is said would save transmission of T-C-RNTI in the preamble acknowledgment, but may consume an unnecessarily large part of the C-RNTI space. In this method, a C-RNTI would be reserved for every possible preamble frequency and signature index for a period of several tens of ms (equal to the duration of cell association procedure), as compared to the case where the Node-B does the selection, where T-C-RNTIs are reserved only for the observed preambles.

Also of potential interest is R1-061893, Preamble-based shared channel ID assignment during initial access, IPWireless, 27-30 Jun. 2006, where it is acknowledged that before data transmission over UL-SCH may occur, the UE must be assigned a C-RNTI (or an ID serving an equivalent purpose—e.g. MAC ID) to identify the user on the SCH. The user's shared channel ID is referred to as the "MAC-ID", and two possibilities are considered:

Explicit MAC-ID assignment and Implicit MAC-ID assignment.

In the explicit MAC-ID assignment case the network explicitly assigns a MAC-ID. The MAC-ID is communicated to the UE either via a common channel (using higher layer IDs for user addressing), or via special channels linked to the random access procedure and used to carry responses to the initial access request (termed RACH-associated channels in R1-061893).

However, in both instances, time/frequency resources need to be set aside, either for the common channels or for the RACH-associated signaling channels. This may be slow or non-responsive to RACH load. Furthermore, initial access delay is increased due to the need for the MAC-ID assignment prior to the commencement of shared channel communications.

For the case of the implicit MAC-ID assignment the initial MAC-ID is implicitly assigned at a very early stage of the connection by means of linking the selected access preamble with one of a set of MAC-IDs reserved in the cell for initial access.

In contrast to the explicit approach, by adopting the implicit MAC-ID assignment it is said that the resource grant messages in initial access procedure may take the same form as any other UL grant message, there is no need for an explicit intermediate MAC-ID assignment prior to the use of the UL-SCH (reduced initial access latency), the need for specially-defined physical/transport channels is avoided (reduced system complexity), and the need for a reservation of time/frequency resources for RACH-associated or common downlink channels is avoided (improved resource efficiency in the presence of varying RACH load).

It is stated that an initial implicit assignment of MAC-ID may be followed at a later stage by an explicit MAC-ID assignment, once the UE is authenticated and admission is granted.

In the approach that is said to be preferred in R1-061893, by selecting a preamble and transmitting this on a particular RACH channel, the UE has effectively also selected a MAC-ID from a pool of reserved MAC-IDs and has conveyed this selection to the eNode-B. There is therefore a set of MAC-IDs (which constitutes a sub-set of the cells total MAC-ID space) that is linked to initial access and the MAC-IDs contained within it are reserved by the eNode-B specifically for this purpose.

After using the MAC-ID, which is implicitly associated with the selected preamble, for initial shared channel communications, it is envisaged that the Node-B would, within a short period of time, explicitly assign a more permanent MAC-ID to the UE such that the MAC-ID originally selected can be released and used by other UEs for initial access. Thus, a UE would occupy an initial access MAC-ID only for a short period of time until the eNode-B reassigns a more permanent MAC-ID. This is termed here the temporary ID lifespan. During this period of time, it is necessary to prevent other UEs from selecting the same temporary MAC-ID. This is achieved by sub-dividing the reserved MAC-ID region into orthogonal sets, each set being applicable for one of the "L" available random access instances that exist within the temporary ID lifespan.

Both of these proposals may thus be considered to employ some type of temporary identity that is assumed by the UE during the non-synchronized random access procedure.

The exemplary embodiments of this invention provide an enhanced non-synchronized random access procedure for use during at least a HO case that does not require the UE to assume a temporary identity, at least during the HO procedure.

Figure 2:
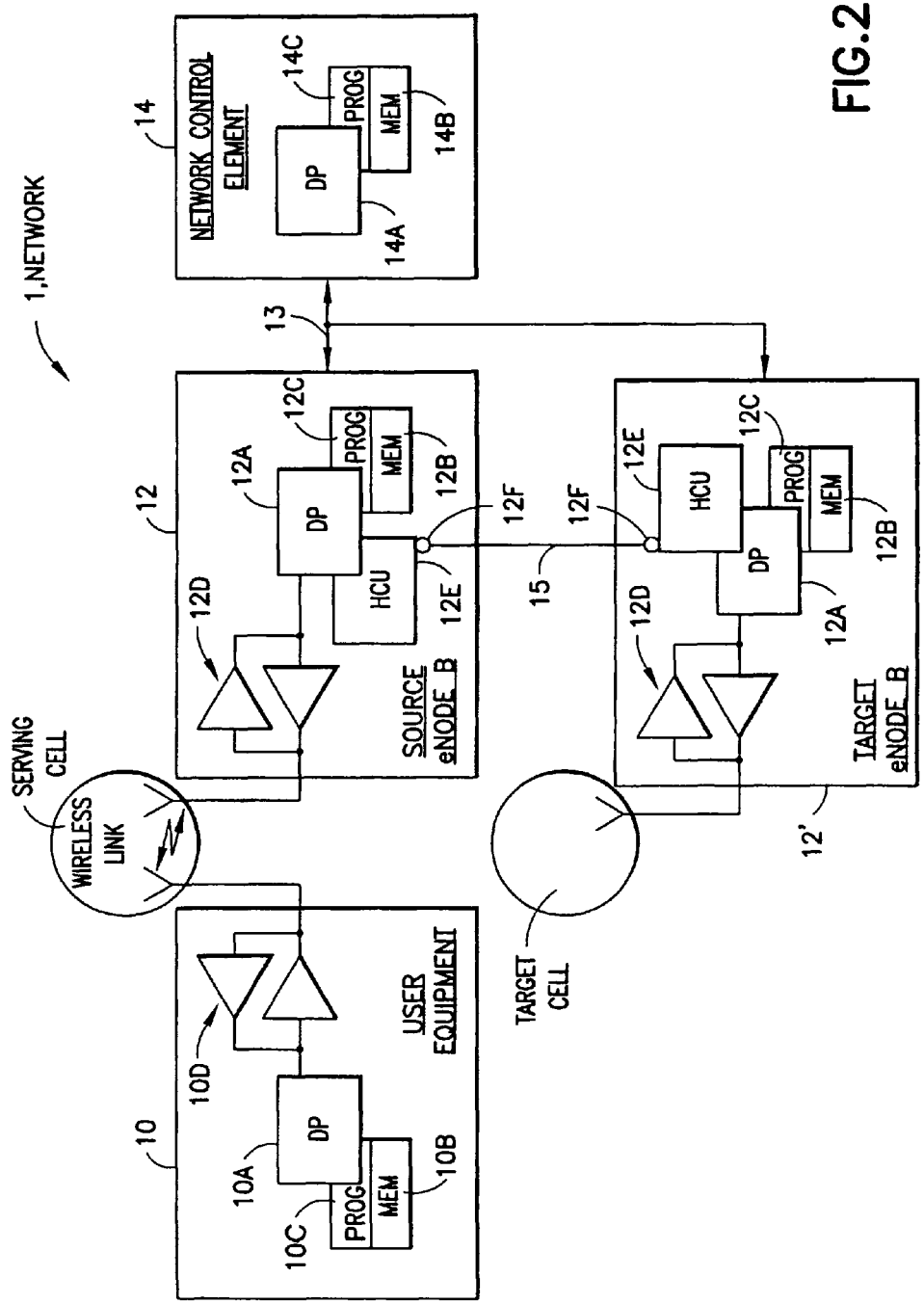
FIG. 2 shows a simplified block diagram of various electronic devices that are suitable for use in practicing the exemplary embodiments of this invention.

Reference is made to FIG. 2 for illustrating a simplified block diagram of various electronic devices that are suitable for use in practicing the exemplary embodiments of this invention. In FIG. 2 a wireless network 1 is adapted for communication with a UE 10 via at least one Node B (base station) 12 (also referred to herein as an eNode B 12). The network 1 may include a network control element 14 coupled to the eNode B 12 via a data link 13. The UE 10 includes a data processor (DP) 10A, a memory (MEM) 10B that stores a program (PROG) 10C, and a suitable radio frequency (RF) transceiver 10D for bidirectional wireless communications with the eNode B 12, which also includes a DP 12A, a MEM 12B that stores a PROG 12C, and a suitable RF transceiver 12D.

The eNode B 12 is typically coupled via the data path 13 to the network control element 14 that also includes at least one DP 14A and a MEM 14B storing an associated PROG 14C. At least one of the PROGs 10C and 12C is assumed to include program instructions that, when executed by the associated DP, enable the electronic device to operate in accordance with the exemplary embodiments of this invention, as will be discussed below in greater detail.

Figure 1B:
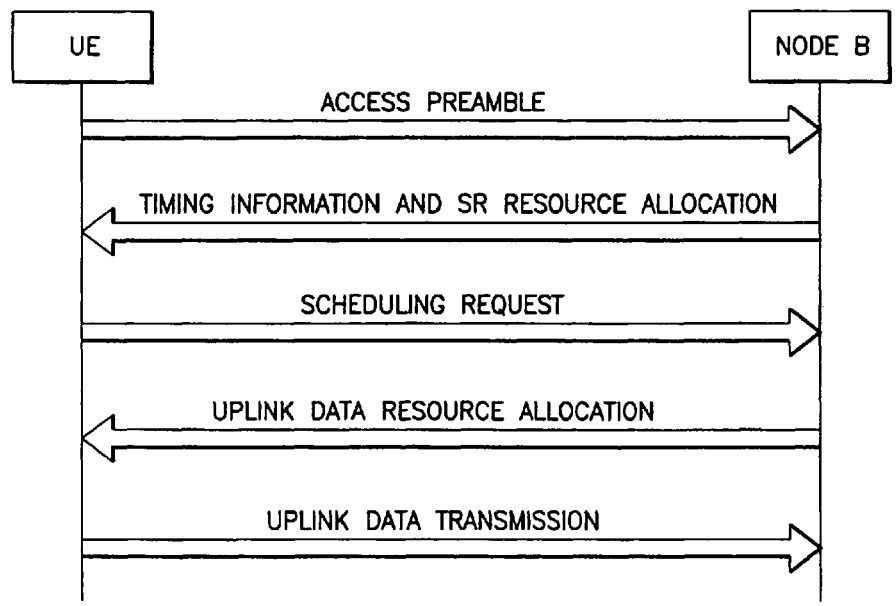

Shown for completeness in FIG. 1 is at least one second eNode B, referred to as 12'. During a HO event the eNode B 12 may be considered the Source eNode B, i.e., the eNode B to which the UE 10 is currently connected and communicating in the associated serving cell, and the eNode B 12' may be considered the Target eNode B, i.e., the eNode B to which the UE 10 is to be connected and communicating with in the target cell after the HO procedure is completed. Note that in practice the serving cell and the target cell with at least partially overlap one another.

Each eNodeB 12, 12' can be assumed to include a handover control function or unit (HCU 12E) that operates in accordance with the exemplary embodiments of this invention, as described in detail below. The HCU 12E can be implemented in hardware, software or a combination of hardware and software. At any given time the HCU 12E of a particular eNodeB can function as a target, or as a source, or simultaneously as a target and a source, depending on the needs of the various UEs 10 serviced by the particular eNodeB. In general, the eNodeBs 12, 12' can communicate with one another via an interface unit 12F over an interface 15. The HCU 12E interface unit 12F can be an E-UTRAN system compatible interface.

Reference may be had, for example, to 3GPP TS 36.300, Technical Specification Group Radio Access Network; Evolved Universal Terrestrial Radio Access (E-UTRA) and Evolved Universal Terrestrial Radio Access Network (E-UTRAN; Overall description; Stage 2 (Release 8) for describing the overall architecture and interfaces. For example, and referring to FIG. 4 of 3GPP TS 36.300, the interface 15 can be the X2 interface, and the link 13 can be implemented as the S1 interface between eNodeBs and the NCE.

In general, the various embodiments of the UE 10 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The exemplary embodiments of this invention may be implemented by computer software executable by the DP 12A of the eNode Bs 12 and 12' in cooperation with the DP 10A of the UE 10, or by hardware, or by a combination of software and hardware.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

Describing now the exemplary embodiments of this invention in even further detail, it is noted that use of the two-step procedure is preferred for non-synchronized random access. It is further noted that thus far the various proposed solutions to the non-synchronized random access procedure have assumed its use in the initial random access case.

However, the inventor has determined that, compared with the initial non-synchronized access, HO-related access has several differences which may be leveraged to increase the performance, as compared with that of directly applying the two-step initial access approach to the HO case. The exemplary embodiments of this invention thus provide a random access procedure that is particularly useful during HO, but should not be construed as being explicitly limited for use to only the HO case.

As was discussed above, in order to resolve a random access collision during an early stage, and make the UE 10 addressable in the SCH directly after being detected, the two-step procedure in the above referenced R1-061901 has been proposed. The basic approach is to reserve a T-C-RNTI pool from the entire C-RNTI pool, to map the non-synchronized parameters to a T-C-RNTI and to then use the T-C-RNTI to address the UE 10 after detecting its preamble. The first DL message sent by the Node-B 12 over DL-SCH would be used to allocate to the UE 10 a permanent C-RNTI. Further communication between the Node-B 12 and the UE 10 would then use the allocated C-RNTI, enabling the T-C-RNTI to be released back to the T-C-RNTI pool.

Figure 3:
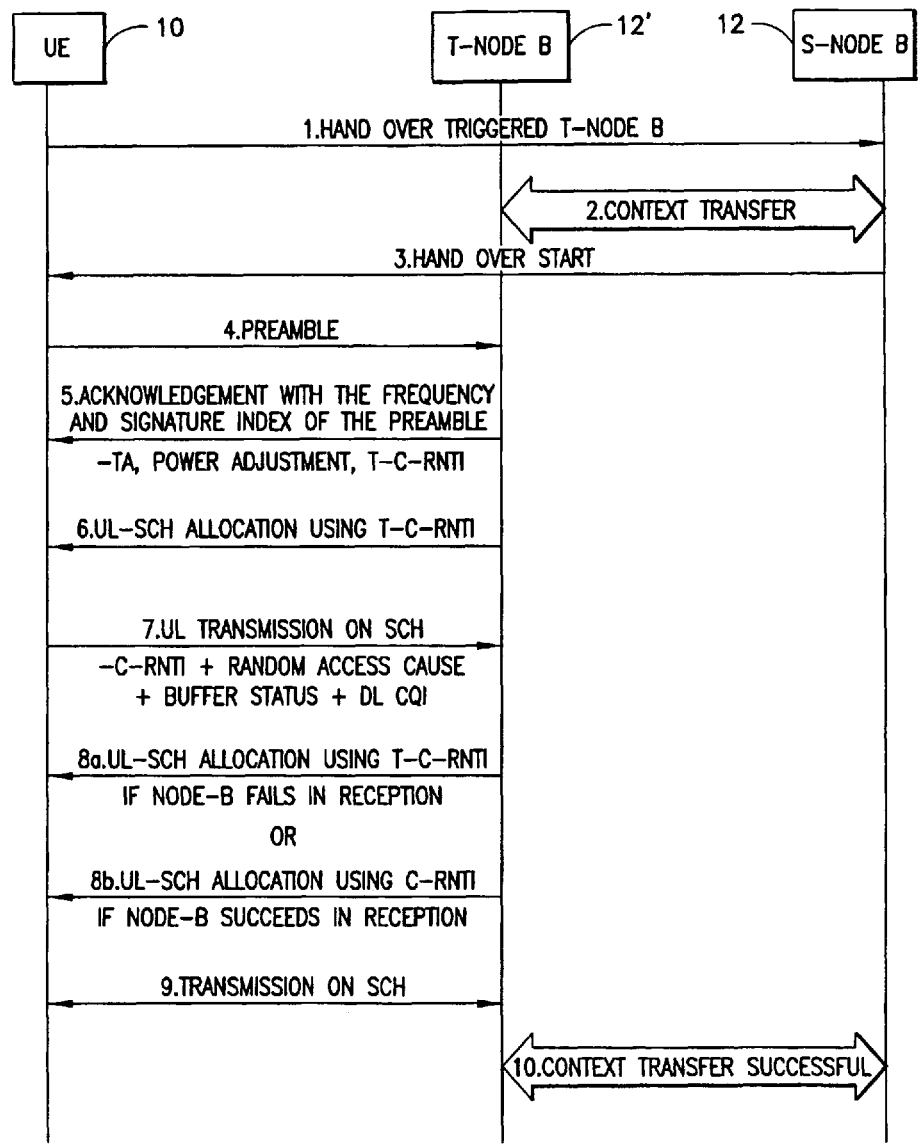
FIG. 3 is a message flow diagram that illustrates a result of directly applying a two-step non-synchronized random access procedure to a HO situation.

By applying this proposed non-synchronized random access procedure to the HO case, the two step non-synchronized random access procedure for HO would operate as shown in FIG. 3. Note in particular the message flows labeled 5, 6, 7, 8a and 8b. The T-C-RNTI is assigned to the UE 10 by the target Node-B 12', along with the TA and power adjustment parameters, in message flow 5, and is used to make the UL SCH transmission (message 7) before the UE 10 is assigned the C-RNTI in message 8b.

Compared with the initial non-synchronized random access case, there are several differences when considering HO non-synchronized random access. For example, the timing and preamble sequence of the access burst may be made known to the target Node-B 12' before it is sent from the UE 10. Further, a schedule request may not be needed. Further still, there need not be a transition period where UE is addressable through T-C-RNTI.

Figure 4:
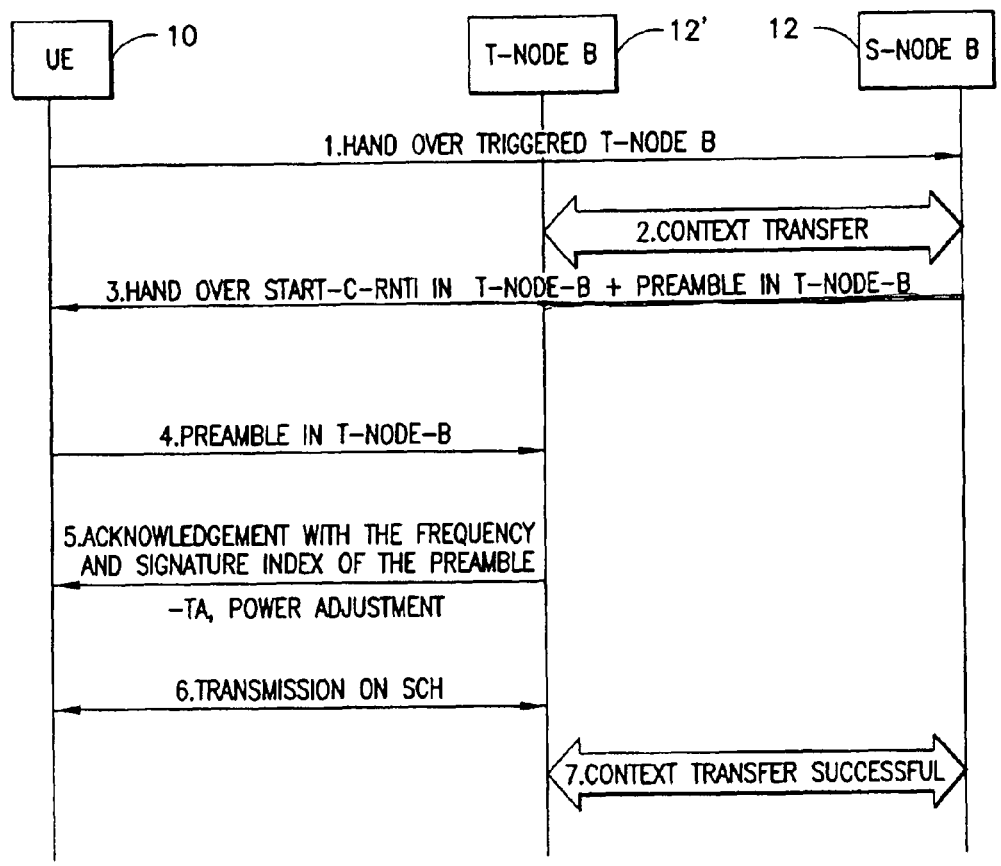
FIG. 4 is a message flow diagram that illustrates a result of applying a one-step non-synchronized random access procedure to the HO situation in accordance with exemplary embodiments of this invention.

Considering at least the above differences, and in accordance with the exemplary embodiments of this invention, an enhanced and improved one step non-synchronized random access procedure for use in the HO case is shown in FIG. 4. Note that in FIG. 4 the S-Node-B 12 assigns the UE 10, in response to the HO trigger (message 1), a C-RNTI in the HO start message 3, and also assigns it a HO-specific preamble sequence for use by the UE 10 when sending the preamble to the T-Node-B 12' in message 4.

There are several important features of note which are further emphasized for the method shown in FIG. 4.

First, the preamble sequence space used by the UE 10 may be divided into two groups: one for initial non-synchronized random access and the other for HO non-synchronized random access. The dividing of sequence space for initial non-synchronized random access and HO may be based on, for example, a load estimation of the two different random access traffic flows, and may be cell specific. Alternatively, a new preamble sequence space may be defined strictly for HO preambles. This HO-specific preamble is the one used during message 4 in FIG. 4, and is the one assigned for use by the S-Node-B 12 as part of message 3.

Second, it is noted that detection of the initial non-synchronized random access preamble is blind, and the Node-B detector will always detect all possible preambles in this group.

Third, detection of the HO non-synchronized random access preamble is need-based. That is, the T-Node-B 12' preamble detector should have a priori knowledge result, a lower threshold may be used to increase the detection probability.

Fourth, there is no time during which the UE 10 would be addressed by the T-Node-B 12' by a T-C-RNTI. Instead, the UE 10 is directly addressable by C-RNTI allocated as part of message 3 from the S-Node-B 12.

Further, there is no need to schedule a RU for sending a resource request from the UE 10, as this information can be transferred through a protocol context from the source Node-B 12 to the target Node-B 12'.

There are a number of advantages that can be realized by the use of the exemplary embodiments of this invention. For example, there is a reduction in the complexity of the non-synchronized random access procedure for the HO case. Further, the detection of the HO preamble sent from the UE 10 is need-based, and its parameters are pre-known to target Node-B 12'. In addition, no false alarms are generated by the use of the HO-specific non-synchronized random access preamble, and a lower threshold can be applied to increase the detection probability. Further, there is no transition time period during which the newly-handed over UE 10 is addressable through a C-T-RNTI, thus enabling the execution of a one step HO non-synchronized random access procedure. Additionally, it can be noted by comparing FIG. 3 to FIG. 4 the one step technique of FIG. 4 provides a more efficient use of the bandwidth and radio resources.

Figure 5:
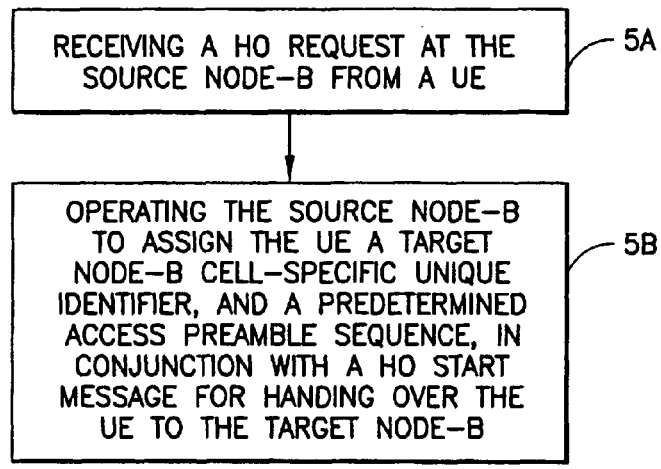
FIG. 5 is a logic flow diagram that is illustrative of a method, and the operation of a computer program product, for the Source Node-B shown in FIG. 2.

FIG. 5 is a logic flow diagram that is illustrative of a method, and the operation of a computer program product, for the Source Node-B 12 shown in FIG. 2. The method comprises: receiving a HO request at the Source Node-B from a UE (Block 5A); and, in response, operating the Source Node-B to assign the UE a Target Node-B cell-specific unique identifier, and a predetermined access preamble sequence, in conjunction with a HO start message for handing over the UE to the Target Node-B (Block 5B). The Target Node-B cell-specific unique identifier is comprised of a Target Node-B cell-specific radio network temporary identifier, and the predetermined access preamble sequence is one known to the Target Node-B to be associated with the UE to be handed over. In an exemplary embodiment of the method the cell-specific radio network temporary identifier and the predetermined access preamble sequence are provided to the Source Node-B from the Target Node-B during a context transfer (message 2 in FIG. 4). Note that in a case where all sequences reserved for HO non-synchronous random access are currently allocated, the two-step procedure may be used as a fall back procedure.

Figure 6:
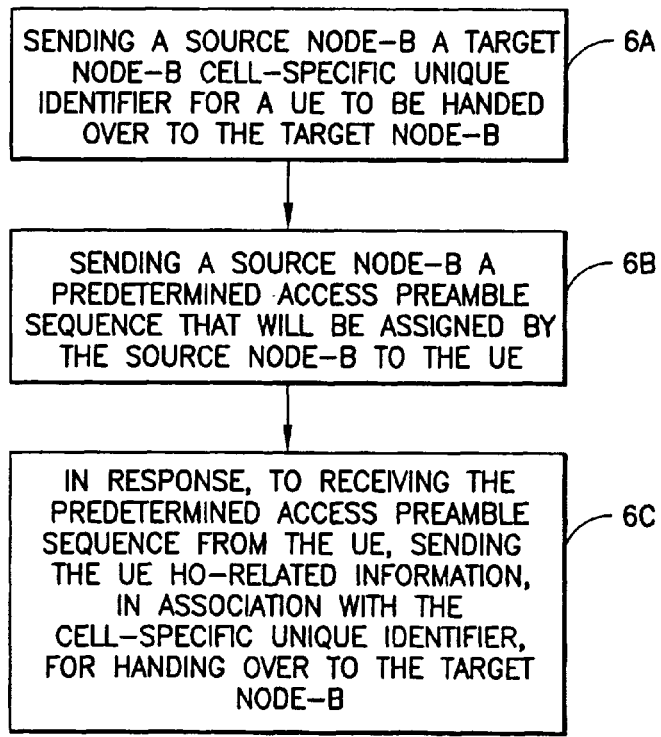
FIG. 6 is a logic flow diagram that is illustrative of a method, and the operation of a computer program product, for the Target Node-B shown in FIG. 2.

FIG. 6 is a logic flow diagram that is illustrative of a method, and the operation of a computer program product, for the Target Node-B 12' shown in FIG. 2. The method comprises: sending a Source Node-B a Target Node-B cell-specific unique identifier for a UE to be handed over to the Target Node-B (Block 6A), sending the Source Node-B a predetermined access preamble sequence for the UE to be handed over to the Target Node-B (Block 6B); and, in response to receiving the predetermined access preamble sequence from the UE, sending the UE HO-related information, in association with the cell-specific unique identifier, for handing over to the Target Node-B (Block 6C). The Target Node-B cell-specific unique identifier is comprised of a Target Node-B cell-specific radio network temporary identifier. In the method, the cell-specific radio network temporary identifier is sent to the Source Node-B from the Target Node-B during a context transfer (message 2 in FIG. 4), and the Source Node-B also receives the predetermined access preamble sequence from the Target Node-B during the context transfer.

Figure 7:
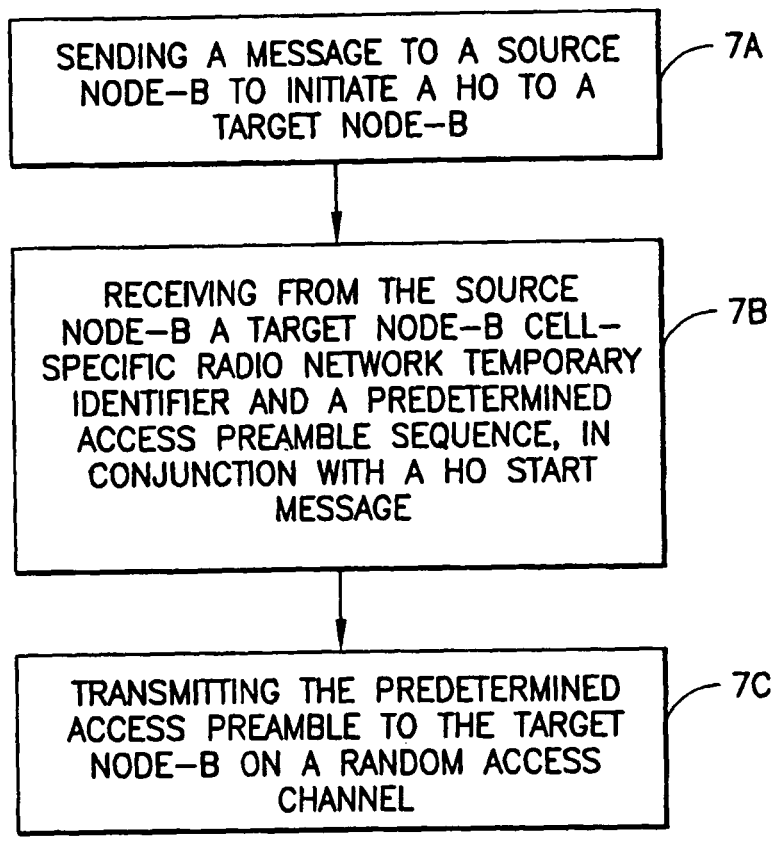
FIG. 7 is a logic flow diagram that is illustrative of a method, and the operation of a computer program product, for the UE shown in FIG. 2.

FIG. 7 is a logic flow diagram that is illustrative of a method, and the operation of a computer program product, for the UE shown in FIG. 2. The method comprises: sending a message to a Source Node-B to initiate a HO to a Target Node-B (Block 7A), receiving from the Source Node-B a Target Node-B cell-specific radio network temporary identifier and a predetermined access preamble sequence, in conjunction with a HO start message (Block 7B), and transmitting the predetermined access preamble sequence to the Target Node-B on a random access channel (Block 7C).

The various blocks shown in FIGS. 5-7 may be viewed as method steps, and/or as operations that result from operation of computer program code, and/or as a plurality of coupled logic circuit elements constructed to carry out the associated function(s).

As such, the exemplary embodiments of this invention also pertain to a base station (Node-B) that is constructed to operate as either a Source Node-B or a Target Node-B. The base station comprises circuitry that is responsive to operation as a Source Node-B, and to a reception of a HO request from a UE to assign the UE a Target Node-B cell-specific unique identifier, that is received from the Target Node-B during a context transfer, and to also assign a predetermined access preamble sequence in conjunction with a HO start message for handing over the UE to the Target Node-B. The Target Node-B cell-specific unique identifier is comprised of a Target Node-B cell-specific radio network temporary identifier, and the predetermined access preamble sequence is one that the Target Node-B sends to the Source Node B to be associated with the UE to be handed over. The base station further comprises circuitry that is responsive to operation as a Target Node-B to send a Source Node-B a Target Node-B cell-specific unique identifier for a UE to be handed over to the Target Node-B, and to send the Source Node-B a predetermined access preamble sequence that will be assigned by the Source Node-B to the UE. The circuitry, in response to receiving the predetermined access preamble sequence from the UE, transmits to the UE HO-related information, in association with the cell-specific unique identifier, for handing over to the Target Node-B. The Target Node-B cell-specific unique identifier is comprised of a Target Node-B cell-specific radio network temporary identifier.

The exemplary embodiments of this invention also pertain to a UE that is constructed to include a transmitter to transmit a message to a Source Node-B to initiate a HO to a Target Node-B and to also include a receiver to receive from the Source Node-B a Target Node-B cell-specific radio network temporary identifier and a predetermined access preamble sequence, in conjunction with a HO start message. The UE stores the received predetermined access preamble sequence and transmits the predetermined access preamble sequence to the Target Node-B on a random access channel during the HO procedure.

As should thus be apparent, both the C-RNTI and the HO access preamble are sent from the Target Node-B 12' to the Source Node-B 12 during the context transfer of FIG. 4 (message 2). Further, the HO access preamble group is maintained by the Target Node-B 12' and allocation from this group is made upon a HO request from the UE 10 through the Source Node-B 12. Further, the C-RNTI pool is a Id pool maintained by all Node-Bs and, in the HO case, the Target Node-B 12' allocates one Id from this pool for the newly incoming UE. The Target Node-B 12' informs the incoming UE 10 of the allocated C-RNTI through the inter-Node-B interface and the existing air interface between the Source Node-B 12 and the UE 10.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, logic flow diagrams, message flow diagrams, or by using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. For example it should be appreciated that the exemplary embodiments apply equally to both FDD and TDD system. Further, some of the blocks shown in FIGS. 5-7 may be executed in a different order, for example, Blocks 6A and 6B of FIG. 6 could be reversed. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
    sending to a source Node-B from a target Node-B a target Node-B cell-specific unique identifier for a user equipment to be handed over to the target Node-B;
    sending to the source Node-B from the target Node-B a predetermined access preamble sequence known to the target Node-B to be associated with the user equipment to be handed over to the target Node-B; and
    in response to receiving, by the target Node-B, the predetermined access preamble sequence transmitted during an access burst from the user equipment, sending from the target Node-B to the user equipment a preamble response comprising an index of the predetermined access preamble sequence, wherein the target Node-B provides to the source Node-B the predetermined access preamble sequence that is assigned by the target Node-B to the user equipment, and the target Node-B knows the timing and the predetermined access preamble sequence of the access burst before the timing and the preamble sequence of the access burst is sent to the user equipment and prior to the user equipment being handed over to the target Node-B so that during the handover procedure the user equipment does not assume a Temporary Cell-Specific Radio Network Temporary Identifier, wherein an access preamble group is maintained by the target Node-B and allocation from the access preamble group is based on load and made upon receiving a handover request.

2. A non-transitory computer readable medium encoded with a computer program executable by a processor to perform actions comprising:
    sending to a source Node-B from a target Node-B a target Node-B cell-specific unique identifier for a user equipment to be handed over to the target Node-B;
    sending to the source Node-B from the target Node-B a predetermined access preamble sequence known to the target Node-B to be associated with the user equipment to be handed over to the target Node-B; and
    in response to receiving, by the target Node-B, the predetermined access preamble sequence transmitted during an access burst from the user equipment, sending from the target Node-B to the user equipment a preamble response comprising an index of the predetermined access preamble sequence, wherein the target Node-B provides to the source Node-B the predetermined access preamble sequence that is assigned by the target Node-B to the user equipment, and the target Node-B knows the timing and the predetermined access preamble sequence of the access burst before the timing and the preamble sequence of the access burst is sent to the user equipment and prior to the user equipment being handed over to the target Node-B so that during the handover procedure the user equipment does not assume a Temporary Cell-Specific Radio Network Temporary Identifier, wherein an access preamble group is maintained by the target Node-B and allocation from the access preamble group is based on load and made upon receiving a handover request.

3. An apparatus, comprising:
    at least one processor; and
    at least one memory including computer program code, where the at least one memory and the computer program code are configured, with the at least one processor, to cause the apparatus to at least:
    send to a source Node-B from a target Node-B a target Node-B cell-specific unique identifier for a user equipment to be handed over to the target Node-B and also send to the source Node-B from the target Node-B a predetermined access preamble sequence known to the target Node-B to be associated with the user equipment to be handed over to the target Node-B; and
    send from the target Node-B to the user equipment, in response to receiving, by the target Node-B, the predetermined access preamble sequence transmitted during an access burst from the user equipment, a preamble response comprising an index of the predetermined access preamble sequence, wherein the target Node-B provides to the source Node-B the predetermined access preamble sequence that is assigned by the target Node-B to the user equipment, and the target Node-B knows the timing and the predetermined access preamble sequence of the access burst before the timing and the preamble sequence of the access burst is sent to the user equipment and prior to the user equipment being handed over to the target Node-B so that during the handover procedure the user equipment does not assume a Temporary Cell-Specific Radio Network Temporary Identifier, wherein an access preamble group is maintained by the target Node-B and allocation from the access preamble group is based on load and made upon receiving a handover request.

4. The apparatus according to claim 3, wherein the target Node-B cell-specific unique identifier comprises a target Node-B cell-specific radio network temporary identifier.

5. The apparatus according to claim 3, wherein both the cell-specific unique identifier and the predetermined access preamble sequence are sent to the source Node-B from the target Node-B during a context transfer.

6. The apparatus according to claim 3, wherein the access preamble group is separate from a preamble for initial non-synchronized random access.

7. The apparatus according to claim 3, wherein the preamble response further comprises at least one of a timing advance parameter and a power adjustment parameter.

8. A method, comprising:
    receiving from a source Node-B a target Node-B cell-specific unique identifier and a predetermined access preamble sequence and a timing of an access burst;
    sending during the access burst the predetermined access preamble sequence at the access timing to a target Node-B on a random access channel, the predetermined access preamble sequence and the access timing being known to the target Node-B to be associated with a user equipment to be handed over; and
    receiving from the target Node-B a preamble response comprising an index of the predetermined access preamble sequence, wherein the target Node-B provides to the source Node-B the predetermined access preamble sequence that is assigned by the target Node-B to the user equipment, and the target Node-B knows the timing and the predetermined access preamble sequence of the access burst before the timing and the preamble sequence of the access burst is sent to the user equipment and prior to the user equipment being handed over to the target Node-B so that during the handover procedure the user equipment does not assume a Temporary Cell-Specific Radio Network Temporary Identifier, wherein a handover access preamble group is maintained by the target Node-B and the size of the access preamble group is based on load and an allocation from the handover access preamble group is made upon receiving a handover request.

9. The method according to claim 8, further comprising:
receiving an addressing message from the target Node-B, wherein the addressing message comprises the target Node-B cell-specific unique identifier.

10. An apparatus, comprising:
at least one processor; and
at least one memory including computer program code, where the at least one memory and the computer program code are configured, with the at least one processor, to cause the apparatus to at least:
receive from a source Node-B a target Node-B cell-specific unique identifier and a predetermined access preamble sequence and a timing of an access burst; and
send during the access burst the predetermined access preamble sequence at the access timing to a target Node-B on a random access channel, the predetermined access preamble sequence and the access timing being known to the target Node-B to be associated with a user equipment to be handed over; and
receive from the target Node-B a preamble response comprising an index of the predetermined access preamble sequence, wherein the target Node-B provides to the source Node-B the predetermined access preamble sequence that is assigned by the target Node-B to the user equipment, and the target Node-B knows the timing and the predetermined access preamble sequence of the access burst before the timing and the preamble sequence of the access burst is sent to the apparatus and prior to the apparatus being handed over to the target Node-B so that during the handover procedure the apparatus does not assume a Temporary Cell-Specific Radio Network Temporary Identifier, wherein a handover access preamble group is maintained by the target Node-B and the size of the access preamble group is based on load and an allocation from the handover access preamble group is made upon receiving a handover request.

11. The apparatus according to claim 10, wherein the target Node-B cell-specific unique identifier comprises of a target Node-B cell-specific radio network temporary identifier.

12. The apparatus according to claim 10, wherein the at least one memory with the computer program code is configured with the at least one processor to cause the apparatus to send a message to the source Node-B to initiate a handover to the target Node-B.

13. The apparatus according to claim 10, wherein the at least one memory with the computer program code is configured with the at least one processor to cause the apparatus to:
receive an addressing message from the target Node-B, wherein the addressing message comprises the target Node-B cell-specific unique identifier.

14. The apparatus according to claim 10, wherein said apparatus is disposed within a user equipment.

15. A non-transitory computer readable medium encoded with a computer program executable by a processor to perform actions comprising:
receiving from a source Node-B a target Node-B cell-specific unique identifier and a predetermined access preamble sequence and a timing of an access burst; and
sending during the access burst the predetermined access preamble sequence at the access timing to a target Node-B on a random access channel, the predetermined access preamble sequence and the access timing being known to the target Node-B to be associated with a user equipment to be handed over; and
receiving from the target Node-B a preamble response comprising an index of the predetermined access preamble sequence, wherein the target Node-B provides to the source Node-B the predetermined access preamble sequence that is assigned by the target Node-B to the user equipment, and the target Node-B knows the timing and the predetermined access preamble sequence of the access burst before the timing and the preamble sequence of the access burst is sent to the user equipment and prior to the user equipment being handed over to the target Node-B so that during the handover procedure the user equipment does not assume a Temporary Cell-Specific Radio Network Temporary Identifier, wherein a handover access preamble group is maintained by the target Node-B and the size of the access preamble group is based on load and an allocation from the handover access preamble group is made upon receiving a handover request.

16. The non-transitory computer readable medium encoded with a computer program according to claim 15, wherein the target Node-B cell-specific unique identifier comprises of a target Node-B cell-specific radio network temporary identifier.

17. The method according to claim 1, wherein the predetermined access preamble sequence is uniquely associated by the target Node-B with the user equipment to be handed over to the target Node-B.

* * * * *